United States Patent
Eisenberg

(10) Patent No.: US 9,392,225 B2
(45) Date of Patent: Jul. 12, 2016

(54) METHOD AND SYSTEM FOR PROVIDING A VIRTUAL CAFETERIA

(71) Applicant: Polycom, Inc., San Jose, CA (US)

(72) Inventor: Aviv Eisenberg, Tel-Aviv (IL)

(73) Assignee: Polycom, Inc., San Jose, CA (US)

( * ) Notice: Subject to any disclaimer, the term of this patent is extended or adjusted under 35 U.S.C. 154(b) by 112 days.

(21) Appl. No.: 14/211,631

(22) Filed: Mar. 14, 2014

(65) Prior Publication Data

US 2014/0267575 A1    Sep. 18, 2014

Related U.S. Application Data

(60) Provisional application No. 61/782,070, filed on Mar. 14, 2013.

(51) Int. Cl.
*H04N 7/14* (2006.01)
*H04N 7/15* (2006.01)

(52) U.S. Cl.
CPC .................................... *H04N 7/152* (2013.01)

(58) Field of Classification Search
CPC ................... H04M 2203/50–2203/509; H04M 3/56–3/569
USPC ..................... 348/14.01–14.16; 370/259–271, 370/351–357; 709/201–207, 217–248
See application file for complete search history.

(56) References Cited

U.S. PATENT DOCUMENTS

| | | | | |
|---|---|---|---|---|
| 4,400,724 | A * | 8/1983 | Fields | 348/14.1 |
| 7,119,829 | B2 * | 10/2006 | Leonard et al. | 348/14.16 |
| 7,174,365 | B1 | 2/2007 | Even et al. | |
| 7,242,421 | B2 * | 7/2007 | Center et al. | 348/14.1 |
| 8,144,181 | B2 * | 3/2012 | Gladstone | 348/14.04 |
| 8,164,617 | B2 * | 4/2012 | Mauchly | 348/14.08 |
| 8,218,829 | B2 * | 7/2012 | Kenoyer | 382/118 |
| 8,228,363 | B2 | 7/2012 | Halavy | |
| 8,446,449 | B1 * | 5/2013 | Miller et al. | 348/14.01 |
| 8,717,400 | B2 * | 5/2014 | Ranganath et al. | 348/14.01 |
| 8,896,655 | B2 * | 11/2014 | Mauchly et al. | 348/14.06 |
| 9,031,855 | B2 * | 5/2015 | Ohmura et al. | 705/5 |
| 2007/0120954 | A1 * | 5/2007 | Allen et al. | 348/14.01 |
| 2007/0264989 | A1 * | 11/2007 | Palakkal et al. | 455/416 |
| 2010/0128105 | A1 | 5/2010 | Halavy | |
| 2010/0315483 | A1 * | 12/2010 | King | 348/14.08 |

* cited by examiner

*Primary Examiner* — Hemant Patel
(74) *Attorney, Agent, or Firm* — Blank Rome, LLP

(57) ABSTRACT

An incidental virtual meeting (IVM) system deployed in multiple rooms can be used to provide a "virtual cafeteria" allowing for incidental meetings and video conferences. Wall endpoints in each room may detect the presence of a person in a proximity to the IVM (wall) endpoint and establish a connection to the associated wall endpoint in the other room, to allow unplanned meetings to occur. A room may have multiple wall endpoints, allowing the room to be connected to more than one other rooms.

17 Claims, 3 Drawing Sheets

METHOD AND SYSTEM FOR PROVIDING A VIRTUAL CAFETERIA

TECHNICAL FIELD

The present invention relates to video communication and more particularly to the field of multipoint video conferencing in an organization.

BACKGROUND ART

Many good ideas that are generated in an organization occur during incidental meetings when two or more persons meet each other in corridors or in cafeterias of the organization. Ideas that can solve an existing need of the organization or that may lead to a new product or feature of a current product may arise out of such a chance meeting. For example, a technical person has an idea for a feature that can be added to a product, he meets the relevant marketing person or another technical person in the cafeteria, and they start talking about the new feature. In another example, a sales person who has just returned from a customer may meet a marketing person in the cafeteria. While talking about the needs of that customer, a new product may be developed.

In large organization, in which the persons are distributed across a plurality of floors or sites, which have a plurality of cafeterias, the probability that two or more persons from two different departments will meet each other in a cafeteria is small.

SUMMARY OF INVENTION

An Incidental Virtual Meeting (IVM) system deployed in multiple rooms can be used to provide a "virtual cafeteria" allowing for incidental meetings and video conferences. Wall endpoints in each room may detect the presence of a person in proximity with the wall endpoint and establish a connection to the associated wall endpoint in the other room, to allow unplanned meetings to occur. A room may have multiple wall endpoints, allowing the room to be connected to more than one other rooms.

BRIEF DESCRIPTION OF DRAWINGS

Example embodiments of the present invention will be understood and appreciated more fully from the following detailed description, taken in conjunction with the drawings in which.

DESCRIPTION OF EMBODIMENTS

Figure 1:
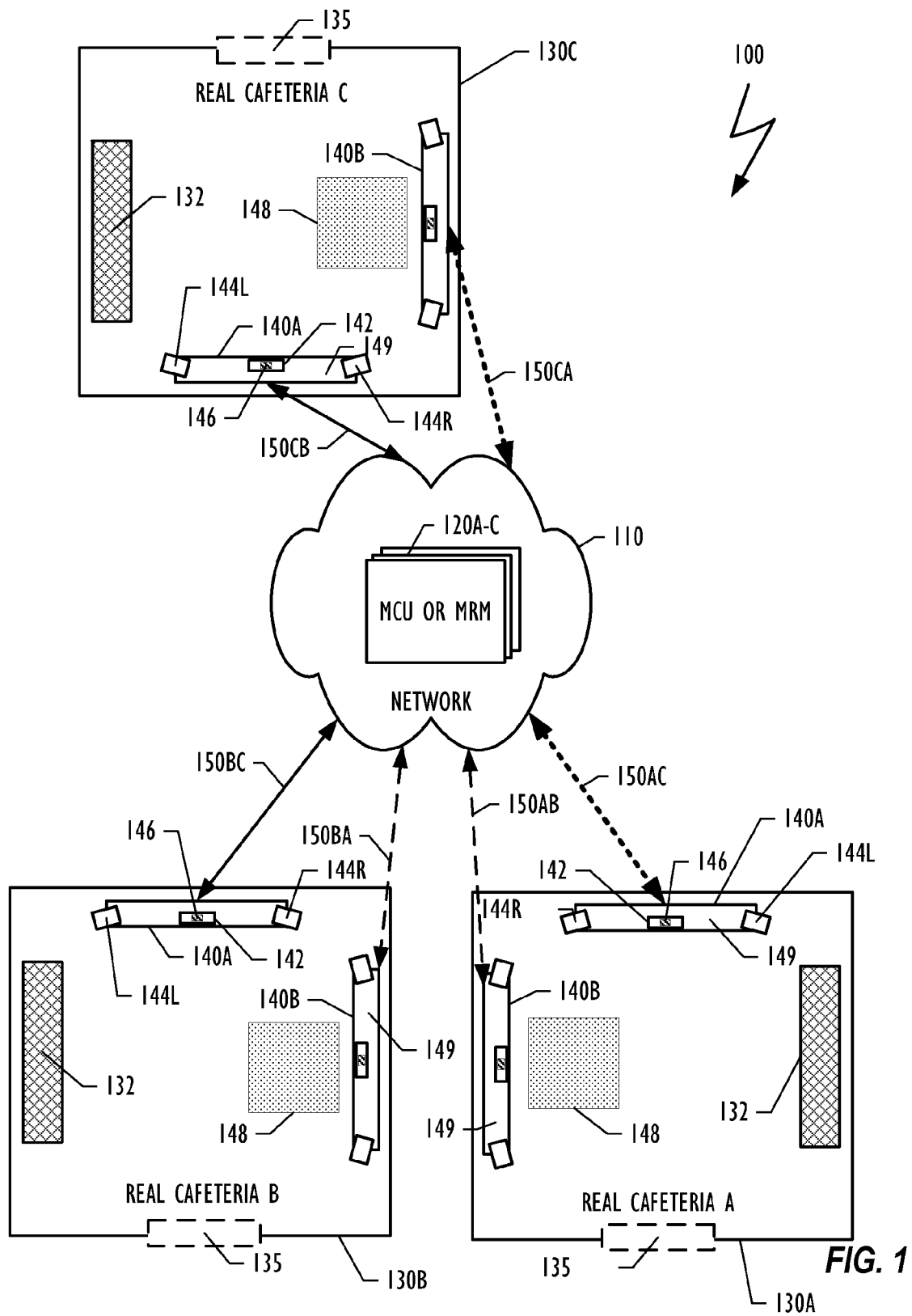
FIG. 1 schematically illustrates a block diagram with relevant elements of an example embodiment of an IVM as a "virtual cafeteria" system.

Turning now to the figures, in which like numerals represent like elements throughout the several views, example embodiments of the present description are described. For convenience, only some elements of the same group may be labeled with numerals. The purpose of the drawings is to describe example embodiments and not for production. Therefore, features shown in the figures are chosen for convenience and clarity of presentation only. Moreover, the language used in this description has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage, etc. In order to execute a certain task, a software program may be loaded to an appropriate processor as needed. In the present description the terms task, method, and process are used interchangeably.

The above-described needs of an organization are not intended to limit the scope of the inventive concepts of the present disclosure in any manner. The organization's needs are presented for illustration only. This disclosure is directed to a novel technique for associating two or more physical rooms into a virtual room by establishing a video conference between persons that are visiting the two or more rooms. Although described below as cafeterias, the techniques and systems described below are not limited to any particular room type, but may be employed in any room or space as desired, including hallways.

In one embodiment, the walls in each of the cafeterias can be covered with one or more large screens. A series of cameras, short-range microphones, and short-range speakers can be placed along the walls. Each set of screens, cameras, short-range microphones, and short-range speakers can be connected to a similar set in another cafeteria. The other cafeteria can be at the same site or at a remote site. The set of screens, cameras, short-range microphones, and short-range speakers in the room is referred herein as a video conferencing wall endpoint (WEP) or an IVM endpoint.

In some embodiments of a WEP with an associated two or more large screen and two or more associated cameras, electronic stitching methods can be employed to generate a large panoramic video image that is created from the video images from the two or more associated cameras. The stitched panoramic video image can be presented over the associated two or more large screens of the WEP. An example of stitching video images is described in U.S. patent application Ser. No. 12/581,626, published on May 27, 2010 as U.S. Patent Publication No. 2010/0128105, the entire content of which is incorporated herein by reference.

In some embodiments, each WEP, after powering on, can be configured to set a videoconferencing connection with a WEP in one or more associated cafeterias, giving the impression that the two or more cafeterias are a single virtual cafeteria. Thus, when a person enters a first cafeteria, he or she may see the other cafeteria and if a person is in one of the associated cafeterias, the entering person, using the short range microphones, can greet the other person and may invite the other person to approach the other WEP and start small talk with the other person, like in a real cafeteria.

In some embodiments, a proximity sensor can be associated with a WEP. The proximity sensor can be configured to determine when a person in the cafeteria approaches the WEP. Upon determining that a person is nearby, the proximity sensor can send an indication to the controller of the WEP informing it to switch from a standby mode to an active private videoconferencing session with the other side of the connection.

A WEP may have elements that are similar to elements of a common video conferencing endpoint (terminal) or IVM system. The WEP may employ similar compression and communication protocols as a common video conferencing endpoint or a media relay endpoint (MRE). A reader who wishes to learn more about communication between endpoints and a multipoint control unit, information describing signaling, control, compression, and setting up a video call is invited to read the International Telecommunication Union (ITU) standards and protocols such as: H.323, H.261, H.263, H.264, G.711, G.722, or read IETF Network Working Group standards and protocols such as, but not limited to, Session Initiation Protocol (SIP) or Moving Picture Experts Group (MPEG).

In some embodiments, each of the cafeterias may contain one or more WEPs. Different walls of a cafeteria may implement different WEPs, associated with the same or different associated other cafeterias. Each WEP may be used for an informal meeting between two or more people in the cafeteria. A WEP in each location can be connected point-to-point with a WEP in another cafeteria. The point-to-point connection can be set directly by the WEP or via a multipoint control unit (MCU).

In an embodiment in which a first WEP in a first cafeteria is associated with a second WEP in a second cafeteria in a point-to-point connection, each point-to-point WEP can be configured to respond to a received trigger from its associated proximity sensor, an activating sensor, by sending a request to establish a point-to-point connection with the relevant WEP. If the activating proximity sensor is associated with the first WEP, then the relevant WEP is the second cafeteria and vice versa.

An example of WEP that has a proximity sensor can operate in two modes: stand-by and active. When in the stand-by mode, the screen and the loudspeakers of the WEP are not active. Only the proximity sensor is active, waiting to capture a nearby person. The active mode is initiated upon sensing a nearby person. In active mode, the screen is activated and presenting the other cafeteria, the loudspeakers can be activated and transferring the sound from the other cafeteria.

In some embodiments that have a proximity sensor, the standby mode can be changed to an active mode when a person enters to his cafeteria and another person is already near the WEP in the associated cafeteria.

In some embodiments, upon establishing the point-to-point connection, a notification can be published in the relevant cafeteria. The notification can be an audio beep, or a welcome message such as "Hi." In some embodiments, the person in the first cafeteria may say "Hello" or even may pull the attention of a certain person that visits the second cafeteria. The connection can remain active for a configurable period of time, the welcome waiting period (WWP), allowing an person in the other cafeteria to reply by a "Hi" (or other welcome message response) or to come close to the proximity sensor associate with the second WEP and start an incidental meeting with the person on the other side. At the end of the WWP, the WEP can be configured to terminate the call if a conferee on the other side of the connection did not reply. In addition, the call can be terminated when the person in the first cafeteria moves away from the proximity sensor. In yet another embodiment, the incidental meeting can be terminated after a configurable period of time in which no or only one proximity sensor is active, indicating a nearby person.

In some embodiments, each WEP can be connected via an MCU. The MCU may determine when to activate each WEP and how to connect them. In such embodiments, the MCU can be configured to obtain the signal from the proximity sensor of each of the WEPs.

A nameplate can be associated with each WEP identifying the name/location of the other cafeteria. For example, an organization that has three cafeterias, one on the first floor in Austin, one on the second floor in Boston, and one on the ninth floor in Boston, may have two WEPs in each cafeteria. In the Austin cafeteria, two WEPs can be installed, each associated with a wall. The nameplate on the first one may indicate that the first WEP is associated with the Boston first floor cafeteria. The nameplate on the second one may indicate that the second WEP is associated with the Boston ninth floor cafeteria, for example. A person that stands in proximity to the first WEP, in Austin, initiates a video conference with the WEP in the Boston first floor cafeteria, etc. In a similar way, the cafeteria in the Boston first floor can have two WEPs, each one over a different wall. One WEP can be associated with Austin and the other with the Boston ninth floor, etc.

Some embodiments of a "virtual cafeteria" system (IVM system) may be configured to establish a multi-point videoconference between persons that are in three cafeterias. A multipoint session may be established, for example, when people in each cafeteria stand in a corner or other region between two WEPs and are detected by the proximity sensors of both WEPs. The multipoint conference can be established by an MCU.

In some IVM systems, a proximity sensor can operate in two mode of operation. The first mode can be referred as a wide-area-proximity sensor (WAPS). The WAPS can cover a large portion of the cafeteria, including the entire cafeteria. A signal from the WAPS can indicate that a person is in the cafeteria. The other mode of operation is a limited-area-proximity sensor (LAPS). The LAPS can cover a small area close to an associated WEP. A signal from the LAPS can indicate that a person is standing close to the associated WEP and is willing to participate in an incidental meeting with a person on the other side of the connection. In some embodiments, the WAPS mode can be implemented by a proximity sensor that is installed in the cafeteria and serves the one or more WEPs that are located in the cafeteria. In other embodiments the WAPS mode and the LAPS mode can be implemented by the proximity sensor that is associated with each one of the WEPs.

These and other aspects of the description will be apparent in view of the attached figures and detailed description. The foregoing summary is not intended to summarize each potential embodiment or every aspect of the present description, and other features and advantages of the present description will become apparent upon reading the following detailed description of the embodiments with the accompanying drawings and appended claims.

Furthermore, although specific example embodiments are described in detail to illustrate the inventive concepts to a person skilled in the art, such embodiments are susceptible to various modifications and alternative forms. Accordingly, the figures and written description are not intended to limit the scope of the inventive concepts in any manner.

FIG. 1 is a block diagram illustrating relevant elements of an example embodiment of a "virtual cafeteria" system (IVM system) 100. IVM system 100 may include a network 110, connecting one or more MCUs 120A-C, and a plurality of real cafeterias 130A-C connected as a single virtual cafeteria (unnumbered). Each real cafeteria 130A-C may be located at a different location, site, or floor in an organization premises. In some embodiments in which network 110 includes a plurality of MCUs 120, a virtual MCU may be used for controlling the plurality of MCUs. More information on a virtual MCU can be found in U.S. Pat. No. 7,174,365, which is incorporated herein by reference in its entirety for all purposes. In some embodiments of system 100, one of the MCUs can perform the functionality of the virtual MCU and may control the rest of the MCUs. In some embodiments, the MCUs 120A-C may be multimedia relay MCUs or MRMs. Although only 3 cafeterias 130A-C are illustrated for clarity, any number of real cafeterias 130 may be connected as a single virtual cafeteria. Similarly, although FIG. 1 illustrates a system in which all the real cafeterias 130A-C are connected in a single virtual cafeteria, the real cafeterias 130A-C may be configured to form multiple virtual cafeterias.

An example real cafeteria 130A-C may comprise a room having a door 135; common furniture 132 of a cafeteria, such as but not limited to a table, a refrigerator, a coffee machine, etc. In addition, the cafeteria room may comprise one or more WEPs 140A-B. Each WEP 140A-B typically is disposed along a wall in the room, but a freestanding WEP may positioned away from a wall, if desired. A floor area 148 is illustrated in FIG. 1 to indicate to the reader an area considered close to WEP 140B. This area may be invisible to the people that visit the cafeteria, or may be marked to facilitate use of the WEPs 140A-B. Although all three real cafeterias 130A-C are illustrated with two WEPs 140A-B, as indicated above any cafeteria 130 may have any desired numbers of WEPs 140.

A WEP 140A-B (which may also be referred to as a terminal) is an entity on the network 110, capable of providing real-time, two-way audio and/or visual communication with another WEP 140A-B or with the MCU 120. A WEP 140A-B may be implemented by a computing device having a large screen 149, one or more loudspeakers 144L and 144R, a video camera 142, and a proximity sensor 146. Not all of these elements are indicated in each of the WEPs 140A-B of FIG. 1 for clarity. Although a single video camera 142 and two loudspeakers 144L and 144R are illustrated in FIG. 1 for clarity, any number of cameras 142 and loudspeakers 144 may be used as desired. A WEP 140 may also comprise one or more short-range microphones (not shown in the drawing) to allow users in association with the WEP 140 to speak or contribute to the sounds and noises heard by the other user standing near another connected WEP 140. The large screen 149 may be mounted on an associated wall in a height that can fit a standing adult at least approximately life size. In some embodiments of a WEP 140, a common HD large screen can be used. The large screen may be installed rotated by 90 degrees in order to be adapted to present a standing person. Alternately, the camera may be rotated by 90 degrees.

Other embodiments of a WEP 140 may comprise two or more large screens associated as one composite huge screen. In addition the WEP 140 may comprise a set of two or more cameras that are adjusted to create a single panoramic image, which is presented over the associated two or more screens of the WEP in the other cafeteria 130. An example of such a WEP 140 can be implemented by a modified RPX-HD telepresence system from Polycom, Inc. The modified RPX-HD can comprise the huge screen, the controller, the microphones and the associated two or more cameras of RPX-HD system without the furniture of the telepresence system. In addition to the microphones of the RPX-HD Telepresence system, a plurality of short-range microphones may be associated with the huge screen of the WEP 140, for capturing the audio of a person that stands near the huge screen. Telepresence methods of associating two or more large screens into a huge screen and adjusting two or more video cameras shooting in the same room into a panoramic video image are well known in the art. Many commercial telepresence systems are manufactured by Polycom, Cisco, HP and others, therefore telepresence techniques will not be further described.

In some embodiments, a short-range microphone or a short-range loudspeaker can be implemented by controlling the audio energy that is received from the microphone or played by the loudspeaker.

An example of a WEP 140 may use a passive infrared (PIR) sensor as a proximity sensor 146. PIR sensors are well known and quite popular in security, automatic doors, etc. Another embodiment of a WEP 140 may use the video camera 142 and image processing methods as the proximity sensor. In such an embodiment, the camera 142 may be configured to capture the nearby area 148 during a standby mode of the WEP 140. The camera 142 may be kept active during the stand-by mode for capturing the image of the nearby area 148. Upon determining a change in the captured image, the WEP 140 can switch into an active mode. Other embodiments may use other type of proximity sensors 146.

After powering on, an example of a WEP 140A-B can be configured to establish a point-to-point connection with an associated WEP 140A-B in another real cafeteria 130A-C. The point-to-point connection can be done directly or via the MCU 120. WEP 140A at the real cafeteria 130B can set a point-to-point connection with WEP 140A at the real cafeteria 130C. The point-to-point connection can be over communication link 150BC and 150CB. WEP 140B at the real cafeteria 130B can set a point-to-point connection with WEP 140B at the real cafeteria 130A. The point-to-point connection can be over communication link 150BA and 150AB. In a similar way WEP 140A at the real cafeteria 130A can set a point-to-point connection with WEP 140B at the real cafeteria 130C. The point-to-point connection can be over communication link 150AC and 150CA, for example.

In some embodiments of WEP 140 that do not include a proximity sensor, each WEP 140 may be configured to establish, upon power-on, a videoconferencing connection with another WEP 140 in the associated cafeteria 130 giving the impression that the two or more cafeterias 130 are a single virtual cafeteria. Thus, when a person enters a first cafeteria 130 she may see the other cafeteria 130 and if a person is standing or sitting in one of the associated cafeterias 130, the entering person can greet the other person and may invite the other person to approach his relevant WEP 140, in the other cafeteria 130, and start a small talk like in real cafeteria, using the short range microphones. In such embodiment, the standby mode may comprise periodically trials to set a point-to-point connection with the associate WEP in another cafeteria. Upon establishing the point-to-point connection, both WEPs 140 switch to an active mode.

An MCU 120 may be used to manage one or more videoconferencing sessions. An MCU 120 is a conference controlling entity that may be located in a node of a network, in a terminal, or elsewhere. The MCU 120 may receive and process several media channels from access ports according to certain criteria and distribute them to connected channels via other ports. Examples of MCUs include the MGC-100 and RMX 2000®, available from Polycom Inc. (MGC-100 is a trademark of Polycom, Inc.; RMX 2000 is a registered trademark of Polycom, Inc.). Some MCUs are composed of two logical units: a media controller (MC) and a media processor (MP). A more thorough definition of an endpoint and an MCU may be found in the International Telecommunication Union ("ITU") standards, such as but not limited to the H.324, and H.323 standards. Additional information regarding the ITU standards may be found at the ITU website www.itu.int.

In another embodiment of an IVM system 100, a media-relay MCU (MRM) can be used instead of an MCU 120. An MRM is another conference controlling entity that may be located in a node of a network, in a terminal, or elsewhere. An MRM may receive several media channels, from access ports, and according to certain criteria may relay them to connected channels via other ports. A reader how wishes to learn more about an MRM is invited to read U.S. Pat. No. 8,228,363, which is incorporated herein by reference in its entirety for all purposes. In alternate embodiments of IVM system 100 a SIP server, which is capable of establishing real time video conferencing session between two terminals, can be used instead of an MCU 120A-C.

Network 110 may represent a single network or a combination of two or more networks. The network 110 may be any type of network, including a packet switched network, a circuit switched network, and Integrated Services Digital Network (ISDN) network, the Public Switched Telephone Network (PSTN), an Asynchronous Transfer Mode (ATM) network, the Internet, or an intranet. The multimedia communication over the network may be based on any communication protocol including H.324, H.323, SIP, etc. The information communicated between the WEPs 140A-B and the MCU 120 may include signaling and control, audio information or video images. The WEPs may provide speech, video, signaling, control, or a combination of them.

The described portion of the system 100 comprises and describes only the most relevant elements. Other sections of a system 100 are not described. It will be appreciated by those skilled in the art that depending upon its configuration and needs of the system, each system 100 may have other number of real cafeterias 130A-C, other number of WEPs 140 in a cafeteria, networks 110, and MCUs 120. However, for clarity, one network 110 with three MCUs 120A-C, three real cafeterias 130A-C, each having two WEPs 140A-B is shown.

In some embodiments of the IVM system 100, the WEPs may be adapted to operate according to various embodiments of the present description to provide virtual cafeteria services that combine cafeterias, in two or more locations, into a single virtual cafeteria of an organization. An example of WEP 140 may be adapted to sense a nearby person or a person in the cafeteria, determine whether another person at another cafeteria is nearby an associated WEP. If such a situation occurs, then the established point-to-point connection can be evoked allowing the two persons that are nearby the associated WEPs to meet with each other. In some embodiments of IVM system 100 the MCU 120 can be involved in the decision making process. In other embodiments, the MCU may just deliver common videoconferencing services to the WEPs. More information about the operation of the MCU 120 and endpoints 140A-C according to different embodiments is disclosed below in conjunction to FIGS. 2 and 3.

Figure 2:
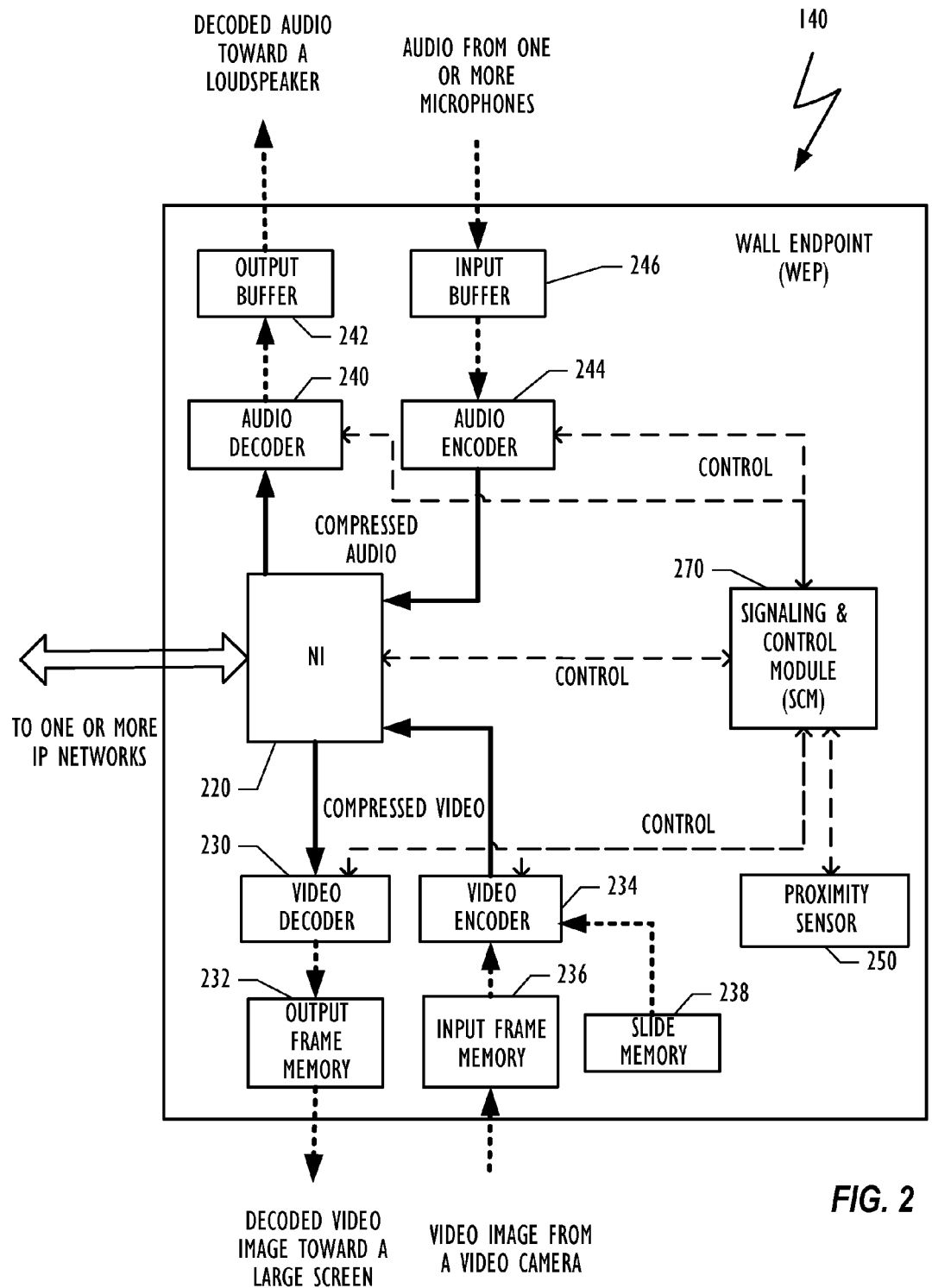
FIG. 2 schematically illustrates a block diagram with relevant elements of an example embodiment of a wall endpoint (WEP).

FIG. 2 illustrates a simplified block diagram with relevant elements of an example WEP 140 for allowing a person visiting a first cafeteria 130 to hold an incidental meeting with another person visiting a second cafeteria 130 of the same organization, for example. Although this description is written in terms of incidental meetings, the reader will recognize that people may use the WEPs 140 for scheduled meetings, as well, even if by simply agreeing among themselves to approach their respective WEP 140 at a given time. FIG. 2 illustrates only elements of the WEP 140 that are related to the meeting process, which means establishing an incidental videoconferencing session between two WEPs when persons are visiting the two cafeterias 130. Elements that are not relevant to the meeting process are not illustrated.

An example of a WEP 140 may comprise a network interface (NI) module 220; a video section including a video decoder module 230, a video encoder module 234, an output frame memory 232, an input frame memory 236, and a slide memory 238. In some embodiments, the video section may include an image processing module, not shown in the drawings, that can process the video image stored in both frame memories 232 and 236. Further, WEP 140 may comprise an audio section including an audio decoder 240, an audio encoder 244, an input buffer 246, and an output buffer 242. In some embodiments, in which two or more microphones are used including short-range microphones, input buffer 246 may further comprise an audio mixer (not shown in the drawings) that mixes the audio received from the two or more microphones before transferring it toward the audio encoder 244.

The operation of the WEP 140 can be controlled by a signaling and control module (SCM) 270 that is associated with a proximity sensor 260. In some embodiments (not shown in the drawings), the audio section may include an interactive voice response (IVR) section that can generate a welcome message. Any desired welcome message, such as "Hi," "Hello," etc. may be used.

The NI 220 may receive signaling, control, and audio/video communication from an associated WEP 140 via networks 110 directly or via an MCU 120. The NI 220 may process the communication according to one or more communication standards including H.323, H.324, Session Initiation Protocol (SIP), etc. The processed communication can carry the media as frames of compressed audio/video. The compressed frames of audio/video frames may be delivered toward the audio decoder 240 or the video decoder 230 respectively. In the other direction, frames of compressed audio/video can be delivered from the audio encoder 244 or video encoder 234 respectively. The obtained compressed frames can be processed by the NI 220 according to the communication standards and be transmitted toward the associated WEP 140 in the other cafeteria 130. More information concerning the communication between endpoints and the MCU over network 110 and information describing signaling, control, compression, and establishing an audio/video call can be found in the International Telecommunication Union (ITU) standards such as but not limited to H.323, H.261, H.263, H.264, G.711, G.722, and MPEG, etc. or from the IETF Network Working Group website (information about SIP).

Video decoder 230 may obtain the stream of compressed video frames from the NI 220, decode it into video image in the shape of a stream of decoded video frames. The decoding is performed according to the compression standard used by the video encoder of the other WEP 140. Compression standards used may include, but are not limited to, H.263, H.264 AVC, or H.264 SVC. The decoded frames may be delivered via an output frame memory 232 toward the large screen 149 of the WEP 140. In the other direction, video images received from the video camera 142 can be aggregated in the input frame memory 236. The video encoder 234 can fetch from the input frame memory 236 one frame after the other, compress each frame, and deliver the compressed frames toward the associated WEP 140 via the NI 220 and network 110.

In some embodiments of a WEP 140, during a standby period in which no one visits the cafeteria 130 having the WEP 140, the encoder 234 can be instructed to obtain video data related to a stored slide in memory 238, compress it, and sent the video image toward the associated WEP 140. The slide image can be a logo of the organization, a background color, a landscape image, or any other desired image, etc. Instead of a slide image, the obtained video data may be a motion video image, possibly in a loop repeating the motion video. During an active mode, the encoder can be switched to obtain and compressed video images from the input frame memory 236.

In some embodiments of a WEP 140, in which the video camera is also used as a proximity sensor, the video encoder 234 may be configured to search for changes between a current obtained frame from the input frame memory 236 and one or more previous obtained frames. Changes can occur when a person passes nearby or stands nearby. Upon detecting such a change, an indication can be send to the SCM 270 that someone has approached the WEP 140, allowing the SCM 270 to switch the WEP 140 from standby mode to active mode.

In some embodiments in which the WEP 140 comprises a modified telepresence endpoint, the video section can be adapted to obtain and encode the video images received from the two or more video cameras. Similarly, the video section can be adapted to decode two or more compressed video images received from the other WEP 140 and display them over a composite screen that is composed from two or more large screens.

Referring now to the audio section, audio decoder 240 may obtain the stream of compressed audio frames from the NI 220 and decode it into playable audio in the shape of a stream of decoded audio frames. The decoding is performed according to the compression standard used by the audio encoder of the other WEP 140, including but not limited to G.711 or G.719. The decoded audio can be delivered via an output buffer 242 toward one or more loudspeakers 144, such as the speakers 144R and 144L of the WEP 140 illustrated in FIG. 1. In the other direction, audio received from one or more microphones (not shown in the drawings) can be aggregated in the input buffer 246. In case that two or microphones are used, input buffer 246 may further comprise an audio mixer that mixes the two or more audio signals. The audio encoder 244 can fetch the stored audio, compress it and deliver the compressed audio frame toward the associated WEP 140 via the NI 220 and network 110. In some embodiments, during a standby period in which no one visits the cafeteria 130, the encoder 244 can be instructed to shut down. In some embodiments, participants at a WEP 140 may be provided with a way to mute the microphones at their end, allowing for a temporary private conversation before resuming the meeting with the participants at the other WEP 140.

The proximity sensor 250 may be a Passive Infrared (PIR) sensor, for example, similar to the sensors that are used in home security systems, etc. Some examples of PIR sensors 250 include: OAWC-P-120W-R, OAWC-P-120W, OAWC-P-009L-H-R, and OAWC-P-009L-H-R, which are manufactured by Cooper Industries Inc. USA. Other examples of a PIR proximity sensor 250 can be can be the 555-2807 sensor manufactured by Parallax Inc. Any desired proximity sensor may be used, including non-infrared proximity sensors.

Other embodiments may use the video camera 142 of the WEP 140 as part of the proximity sensor 250. In such embodiments, the camera 142 can be kept active during the stand-by mode capturing the image of the nearby area. The proximity sensor module 250 may be adapted to compare between a current obtained video frame from the frame memory 236 and previous received one or more video frames. An example of such proximity sensor module 250 may be adapted to calculate three average values, one for each of the red, green, and blue channels received from the video camera 142. The current average value of each channel may be compared to a stored average value of the channel, which was calculated as the average of the previous few frames, for example the previous 5 to 10 frames. Other embodiments may use other statistical parameters in order to determine a change. For example, a median value can be used. Upon determining that a change in the captured image is identified, the proximity sensor module 250 can send an indication to the SCM 270. In response, the SCM 270 can switch the WEP 140 from standby to the active mode. Other embodiments may use other type of proximity sensors.

The SCM 270 may be a logical unit that controls the operation of the WEP 140. In addition to common operation of a typical videoconferencing endpoint, the WEP 140 is capable of initiating an incidental video conferencing session as result of having the SCM 270. Although not shown in FIG. 2 for clarity, the SCM 270 may include a processor a computer readable medium such as a read/write hard disc, CDROM, Flash memory, ROM, or other memory or storage, etc. The storage device may store a software program that is loaded to the processor, providing instructions that when executed cause the processor to perform various actions. The processor can control the WEP 140 to provide an incidental meeting between two persons of happen to two different cafeterias at the same time. Although in some cases, the WEPs 140 may be deployed by a single organization, the WEPs 140 may be deployed by multiple organizations who wish to allow for incidental meetings as described herein.

The SCM 270 can be adapted to receive information from the proximity sensor 250. Such information can include, but is not limited to an indication that a person is visiting the associated cafeteria 130 or that a person is standing in the area 148 close to the WEP 140. Other embodiments of a WEP 140 may not have any proximity sensor. Such a WEP may not have a standby mode, or may require some direct interaction with the WEP 140 to switch it from standby mode to active mode. If no standby mode is available, at the end of a power-on process of the WEP 140, the SCM 270 may be configured to establish the point-to-point connection with the other WEP 140 and start the point-to-point video session even when the two cafeterias 130 are empty with no one there. More information on the operation of SCM 270 is described below in conjunction with FIG. 3.

Figure 3:
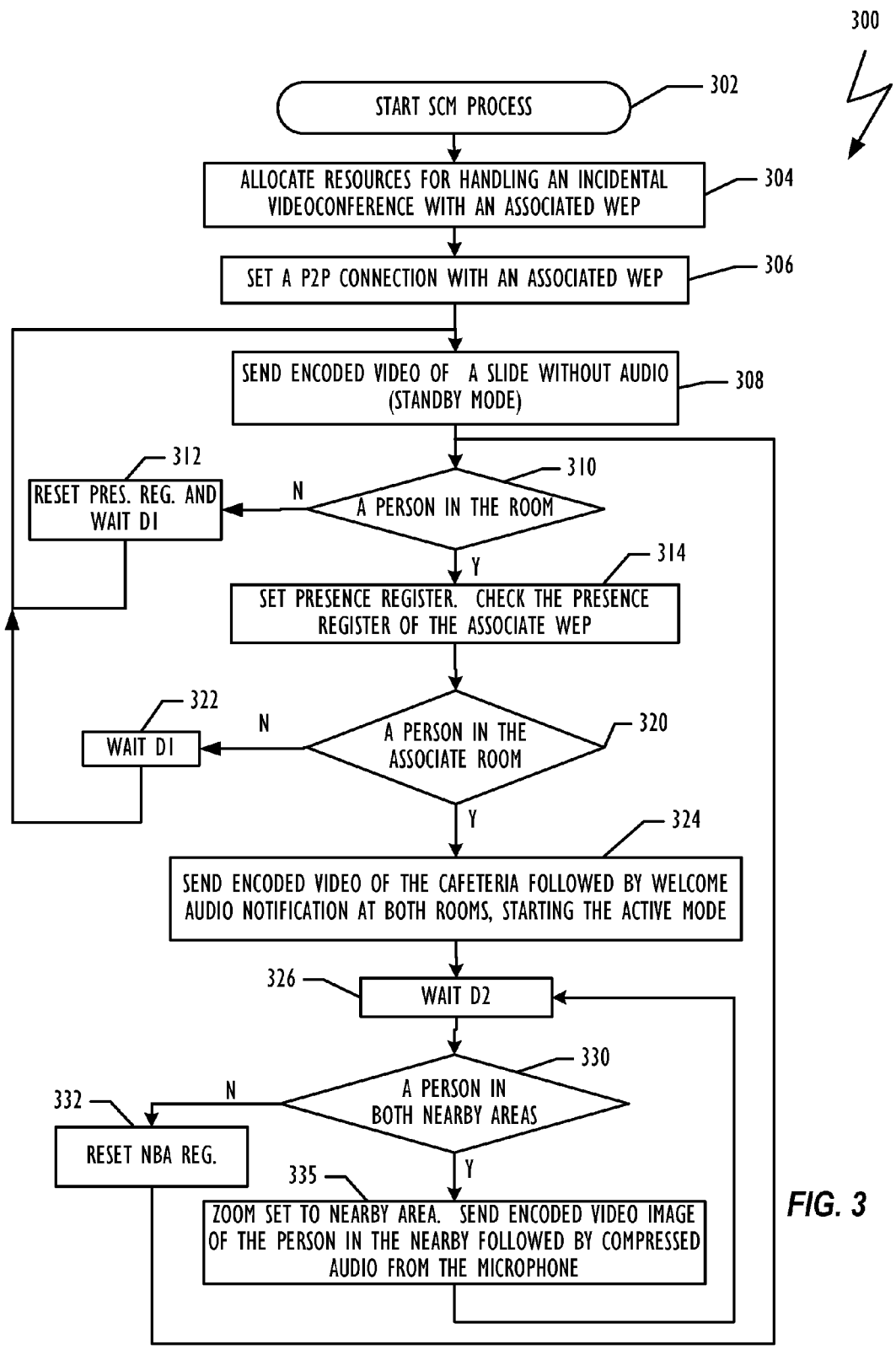
FIG. 3 is a flowchart illustrating relevant actions of a method for controlling an incidental virtual meeting.

FIG. 3 illustrates a flowchart with relevant actions of an example technique 300 for providing and controlling an incidental meeting at two different locations 130. Technique 300 can be implemented by SCM 270 of the connected WEPs 140. Technique 300 may be initiated 302 when the WEP 140 is turned on. Upon initiation, SCM 270 may implement in block 304 common power-on operations of a videoconferencing endpoint, such as, but not limited to, loading relevant programs and allocating computing and storage resources to the other modules of the WEP 140, such as, but not limited to, the video section or the audio section. At block 304, registers, timers etc. that are used by method 300 can be allocated too. Next, at block 306 the NI module 220 can be instructed to establish a point-to-point connection with an associated WEP 140. The connection can be established directly or via the MCU 120. If the WEP 140 represents the WEP 140A in cafeteria 130B, then the associated WEP 140 is WEP 140A in cafeteria 130C and the relevant point-to-point connection is done over communication links 150BC, 150CB and the network 110 that comprises the MCU 120.

In some embodiments, each WEP 140 can be preconfigured to call a dial-in number of its associated WEP 140. The dial-in number can be an ISDN number of the associated WEP 140 for an Integrated Services Digital Network (ISDN) network 110. Alternatively, the dial-in number can be an IP address and port of the associated WEP 140, when network 110 is based on Internet Protocol (IP) and a SIP server can be used or an MCU 120 can be used, etc. After establishing the point-to-point connection in block 306 with the associated WEP 140, method 300 may initiate the standby mode.

At block 308, the encoder 234 may be instructed to obtain the video image stored in the slide memory 238 instead of the video image stored in the frame memory 236, encode the video image, and send it toward the associated WEP 140 via NI 220. After a few frames in which the encoder improves the quality of the compressed image, the bandwidth consumption of the compressed image is reduced to minimal. The number of frames for improving the quality of the compressed image can be in the range of five to fifteen frames, depending on the content of the slide image.

The technique 300 may then verify in block 310, using the proximity sensor 250, whether a person is in the cafeteria 130. If not, a presence register or other indicator can be reset (set to false) in block 312. Technique 300 may then wait in block 312 for a predetermined configurable time period D1. In some embodiments, D1 may be configured in the range of a few tens of milliseconds to a few hundreds of milliseconds. At the end of the waiting period D1, technique 300 may return to block 308.

If in block 310, there is a person in the cafeteria 130, then the presence register or other indicator may be set to indicate the presence of a person (e.g., set to true) and technique 300 may check the in block 314 to determine whether there is a person in the associate cafeteria 130. The verification can be done by communicating with the SCM 270 of the associated WEP 140. The communication can be done by using the signaling and control connection or via an out of band connection, for example, a separate IP connection. In other embodiments, the verification can be done by using image processing methods on a stored image in the output frame memory that obtains decoded video received from the other cafeteria 130. If in block 320 there is no one in the associate cafeteria 130, then technique 300 may wait in block 322 for the waiting period D1 before returning to block 308.

If in block 320 there is a person in the associated cafeteria 130, then the encoder 234 may be instructed to fetch a video image in block 324 and compress the video image stored in the input frame memory 236 that is received from the video camera 142, then send the compressed video toward the other WEP 140. In addition, a welcome notification can be generated by the audio section of the WEP 140 and played on the loudspeakers 144 of both WEPs 140. The welcome notification can be any desired notification, such as a beep or an IVR message such as "Hi," "Hello," etc. Technique 300 may then wait in block 326 for a predetermined configurable waiting period D2, which may be in the range of few seconds to few hundreds of seconds, for example, 10-240 seconds. During the waiting period D2, some embodiments may repeat the welcome notification one or more times.

After the waiting period D2, a decision can be made in block 330 whether there is a person in the nearby area 148 of each of the WEPs 140. In one embodiment of a WEP 140, the decision can be based on image processing of two video images, one that is received from the video camera 142 of the WEP 140 and is stored in the input frame memory 236, and the other video image received from the associated WEP 140 via the network 110, NI 220, the video decoder 230 and stored at the output frame memory 232. An example of image processing can be configured to search for changes in a configurable predefined area of the video image that comprises the nearby area of the WEP 140. The changes between a current obtained frame from the frame memory 236 or 232 and one or more previous one may occur when a person enters or stand at nearby area 148.

One embodiment of the video section comprises an image processing module, which may be adapted to calculate three average values, one each for the red (R), green (G), and blue (B) channels transferred via the frame memory 236 or 232. The current average value of each channel can be compared to a stored average value for that channel (R, G, B) that was calculated as the average of a previous few frames, for example, 5 to 10 frames. Other embodiments may use other statistical parameter in order to determine a change. A median value of the channel may be used, for example. Other embodiments may use a second PIR proximity sensor 250 that is adapted to cover the nearby area 148 of the WEP 140.

If in block 330 there is a person in the nearby area 148 of both WEPs 140 in both cafeterias 130, then technique 300 may proceed to block 335. If in block 330 no one is in the nearby area of each of both WEPs 140, then technique 300 can reset in block 332 a near-by register (NBR) or other indicator and return to block 310.

At block 335, in some embodiments of a WEP 140 the zoom of the cameras 142 in both cafeterias 130 can be modified to zoom-in, covering the nearby area 148 of each of the WEPs 140. In other embodiments the one or more cameras may have a fixed focus. The audio encoder 244 can be instructed to obtain audio signals received from the short-range microphones of the WEPs 140 via the input buffer 246, mix the audio signals, if needed, and compress them according to a selected audio compression standard, such as but not limited to G.719. The compressed audio may be sent via the NI 220 toward the associated WEP 140. In the other direction, received compressed audio from the associated WEP 140 is decoded by the audio decoder 240 and transferred toward the loudspeakers 144 of the WEP 140.

In a similar way at block 335, the video encoder 234 can be instructed to obtain video frames received from the video camera of the WEP 140 via the frame memory 236, compress them according to a selected video compression standard, such as but not limited to H.264. The compressed video is sent via the NI 220 toward the associated WEP 140. In the other direction, received compressed video from the associated WEP 140 is decoded by the video decoder 230 and transferred toward the large screen 149 of the WEP 140. Thus, at block 335 the incidental videoconferencing session is provided connecting the persons in both cafeterias 130 and providing the experience of a virtual cafeteria to the participants at both sites. Next process 300 can return to block 326 for another waiting period D2.

In another embodiment of a WEP 140 that does not have a proximity sensor, technique 300 may be modified to exclude blocks 308 to 330 and block 332. Thus, a point-to-point videoconferencing session may be established after the power-on process regardless of whether there is a person in each of the cafeterias 130.

In some embodiments, an MCU 120 that conducts the point-to-point connection can be further modified to execute the technique 300. Such an MCU 120 may decode the received video images from both WEPs 140 in order to determine that a person is visiting their cafeteria 130. In an alternate embodiment, the MCU 120 may receive, over a control connection, information from the proximity sensor of each of the WEP 140 and acts accordingly.

It will be appreciated that the above-described apparatus, systems and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure may be implemented by combination of features and elements that have been described in association to different embodiments along the discloser. The scope of the invention is limited only by the following claims and equivalents thereof.

While certain embodiments have been described in details and shown in the accompanying drawings, it is to be understood that such embodiments are merely illustrative of and not devised without departing from the basic scope thereof, which is determined by the claims that follow. In the appended claims, the terms "including" and "in which" are used as the plain-English equivalents of the respective terms "comprising" and "wherein."

I claim:

1. An incidental virtual meeting (IVM) system comprising:
   a first IVM endpoint installed in a first room, comprising:
      a proximity sensor configured to detect a first person in the first room;
      a controller, configured to:
         instruct the first IVM endpoint to send a video image of pre-recorded data to a second IVM endpoint in a second room responsive to the proximity sensor detecting no one; and
         establish an incidental videoconferencing session with the second IVM endpoint and transfer a video image of the first room to the second IVM endpoint responsive to the proximity sensor detecting the first person in the first room.

2. The IVM system of claim 1, wherein the first IVM endpoint is further configured to create a point-to-point connection with the second IVM endpoint upon powering on the first IVM endpoint.

3. The IVM system of claim 1,
   wherein the second IVM endpoint is configured to:
      detect a second person within the second room; and
      notify the first IVM endpoint of the presence of the second person, and
   wherein the first IVM endpoint is further configured to establish the incidental videoconferencing session responsive to the detection of the first person and the detection of the second person.

4. The IVM system of claim 1, wherein the incidental videoconferencing session is established via a multipoint control unit.

5. The IVM system of claim 1, further comprising:
   a third IVM endpoint installed in the first room; and
   a fourth IVM endpoint installed in a third room, configured to connect to the third IVM endpoint for another incidental videoconferencing session.

6. The IVM system of claim 1, wherein the first IVM endpoint further comprises:
   a display;
   one or more video cameras associated with the display and capturing a space of the first room; and
   a short-range microphone associated with the display, configured to capture voice from an area within a predetermined distance of the display.

7. The IVM system of claim 1, wherein the controller of the first IVM endpoint is further configured to:
   instruct the first IVM endpoint to terminate the incidental videoconferencing session responsive to detecting that no one is detected by the proximity sensor.

8. The IVM system of claim 1, wherein the proximity sensor is a passive infrared sensor.

9. The IVM system of claim 6, wherein the display is oriented for presenting a standing person.

10. The IVM system of claim 6,
    wherein the display comprises a composite display formed from two or more screens, and
    wherein the controller is further configured to display a video image across the composite display.

11. An incidental virtual meeting (IVM) endpoint comprising:
    a display;
    one or more video cameras coupled to the display, configured to capture a space of a first room;
    a short range microphone coupled with the display and configured to capture voice from an area proximate to the display;
    a proximity sensor configured to sense when a person is in the first room and generate a person-in-the-room indication; and
    a controller, configured to:
       establish an incidental videoconferencing session with a second IVM endpoint in a second room upon detection of people in both rooms;
       send a video image of a prerecorded data file to the second IVM endpoint; and
       switch to transfer a video image of the first room upon obtaining the person-in-the-room indication generated by the proximity sensor.

12. The IVM endpoint of claim 11, wherein the proximity sensor is a passive infrared sensor.

13. The IVM endpoint of claim 11, wherein the display is oriented for presenting a standing person.

14. The IVM endpoint of claim 11, wherein the display comprises a plurality of screens composited as a single display.

15. A method for establishing an incidental videoconference between two persons that are visiting two different rooms, the method comprising:
    establishing a point to point connection between a first incidental virtual meeting (IVM) endpoint located in a first room with a second IVM endpoint located in a second room; and
    providing capabilities for conducting an incidental videoconference session between a person in the first room and a person in the second room, comprising:
       sensing with a proximity sensor of the first IVM endpoint that a person is in the first room;
       instructing the first IVM endpoint to switch from a standby mode to an active mode; and transmitting a video image of the first room to the second IVM endpoint.

16. The method of claim 15, wherein the first room is a cafeteria in a first location of an organization and the second room is a second cafeteria in a second location of the organization.

17. The method of claim 15, wherein providing comprises employing a short-range microphone configured to obtain audio signals only from a nearby area of the IVM endpoint.

\* \* \* \* \*